Patented Sept. 4, 1945

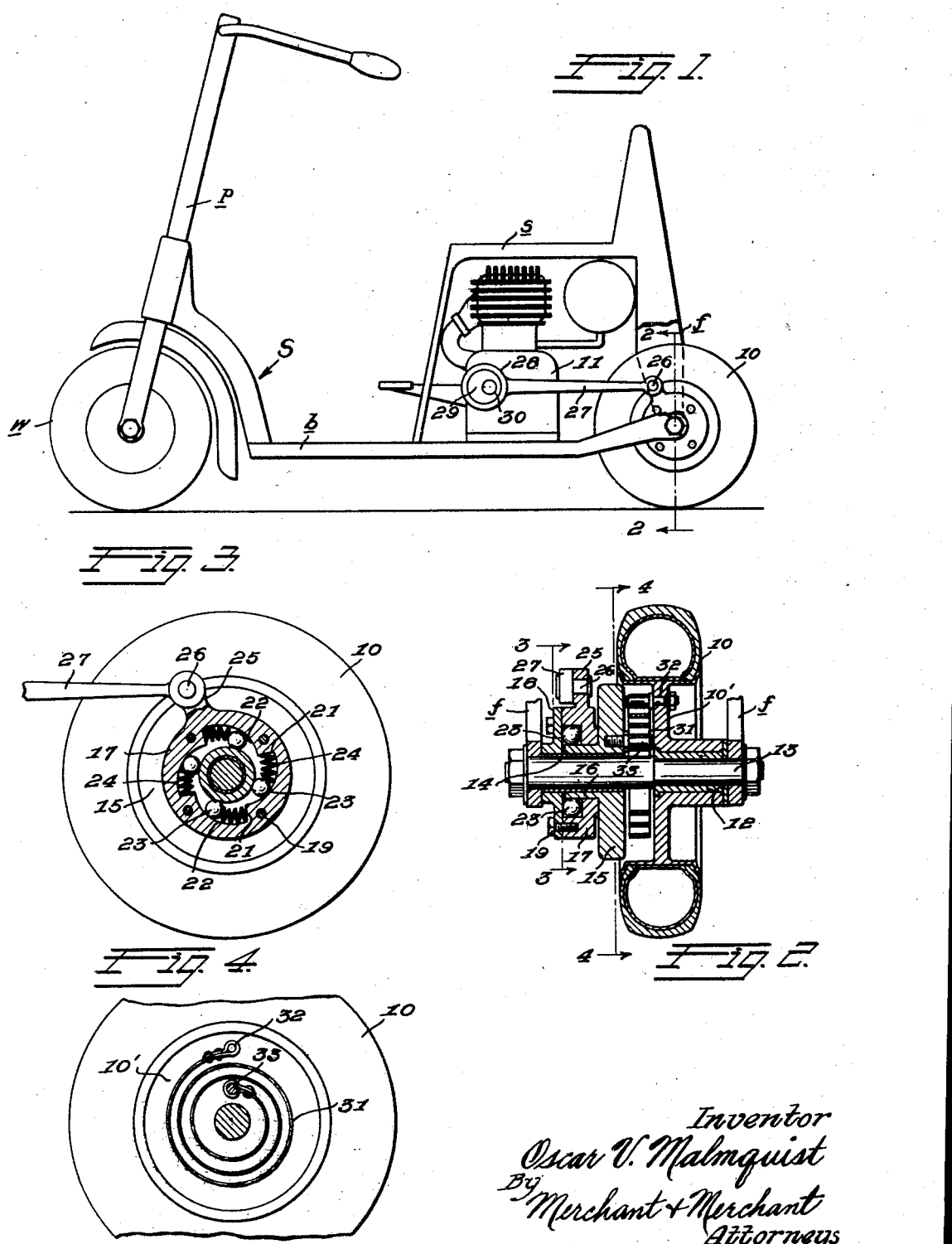

2,384,110

UNITED STATES PATENT OFFICE 2,384,110

POWER TRANSMISSION MECHANISM

Oscar V. Malmquist, Minneapolis, Minn.

Application January 15, 1944, Serial No. 518,367

5 Claims. (Cl. 74—114)

The present invention relates to a power transmission mechanism.

In its more specific aspects, the invention is concerned with an improved transmission mechanism for operative association with a source of power, such as an internal combustion engine and a rotary member, such as a wheel adapted to be rotated by the source of power through the intervention of the transmission mechanism.

In transmission mechanisms, as at present in use, particularly when applied to vehicles, means are included therein for making or breaking the driving connection between the source of power and rotary member driven thereby as a necessary adjunct when it is desired to bring a vehicle equipped with such mechanism to a standstill. In other words, the usual transmission mechanisms for vehicles include shiftable drive connections having non-yieldable engagement for positive actuation of the driven rotary member as the drive wheel of a vehicle, and which drive connections must be shifted out of driving connection with the wheel or wheels in order to bring the vehicle to rest.

The improved transmission mechanism in accordance with the present invention has as a primary object thereof, the provision of a yieldable drive connection therein, which without the necessity of adjustment thereof, functions to impart rotation to a vehicle drive wheel upon acceleration of the power mechanism operatively connected to the transmission mechanism and which also functions during idling movement of the power mechanism to impose a minimum driving effort on the drive wheel whereby the vehicle may be retained at rest upon slight braking action against movement thereof.

A further object of the invention is the provision of a transmission mechanism for operative association with a prime mover and a drive wheel including an intermittent one-way clutch whereby free wheeling is provided for a vehicle equipped therewith.

A still further object of the invention is the provision of a transmission mechanism for operative association with a prime mover and a rotary member including a yieldable drive connection whereby any sudden load on the prime mover in the event of an obstruction met by the rotary member is avoided.

A still further object of the invention is the provision of a power transmission mechanism of the character above referred to which is durable, relatively simple in construction, and which provides maximum service with a minimum of effort on the part of an operator.

These, together with further objects will be understood upon consideration of the following detailed description, taken in connection with the drawing, wherein—

Figure 1 is a side elevational view of a vehicle of the scooter type showing a practical application of the invention;

Fig. 2 is an enlarged vertical sectional view in a plane substantially as represented by the line 2—2 in Fig. 1;

Fig. 3 is a vertical sectional view in a plane substantially as represented by the line 3—3 in Fig. 2; and Fig. 4 is a similar view in a plane substantially as represented by the line 4—4 in Fig. 2.

Referring now in detail to the drawing, S designates a vehicle of the scooter type embodying in general a chassis or base b, front wheel w having a steering post p, a seat s and a rear or driving wheel 10 operatively connected with a source of power such as an internal combustion engine 11 supported on the base b.

It is to be distinctly understood at the outset that the invention is shown in association with a scooter type vehicle merely as one example of its application, and that the invention is capable of application to other forms of machines since the invention pertains to power transmission mechanism for operative association with a prime mover and a rotary member to be driven thereby.

In the particular illustration, the wheel 10 is rotatably journalled on a bearing sleeve 12 supported adjacent one end of an axle 13, which axle is in turn rigidly supported at its ends by the bifurcated rear frame portions of the base b and designated at f, in Figs. 1 and 2.

Supported by the shaft 13 adjacent its other end is a second bearing sleeve 14. On this bearing sleeve 14 adjacent the driving wheel 10 is journalled, for free rotation, a fly wheel 15 having a hub portion 16 projecting outwardly of the wheel 10.

The body portion 17 of an intermittent one-way clutch member is journalled for free rotation on the hub portion 16 adjacent the fly wheel 15, and a cover plate 18 removably secured to the body portion 17, as by bolts 19, is journalled for free rotation on the sleeve 14 outwardly of the hub portion 16.

The body portion 17 of the clutch opens out at one side thereof in the provision of spring engaging shoulders 21 interconnected by arcuate camming walls 22 which as indicated in Fig. 3 successively extend from the outer terminus of each shoulder to the inner terminus of adjacent shoulders whereby such camming walls approach the hub portion 16 in a direction opposite to wheel rotation.

Balls 23 are disposed in the clutch body portion 17 in rolling engagement with the walls 22 and the hub portion 16 and are backed by coil springs 24 which are compressed between the balls and the shoulders 21.

The clutch body portion 17 is provided with an apertured ear 25 to which is pivotally connected, as at 26, one end of a pitman 27 having at its opposite end a strap 28 rotatively embracing an eccentric 29 on a shaft 30.

In the present instance, the shaft 30 is illustrated as the engine cam shaft which rotates at one-half engine crankshaft speed thereby providing a desirable speed reduction gearing for the particular vehicle disclosed. It is, however, to be understood that the pitman 27 may be operatively connected with crank shaft if desired.

A torsional drive connection is provided between the fly wheel 15 and the parallel disk body portion 18' of the wheel 10 by means of a relatively wide spirally wound torsion spring member 31. The outer end of this spring member is connected to the wheel disk, as at 32, and the inner end thereof is connected to the fly wheel 15, as at 33.

The spiral spring drive connection just described, and illustrated in Fig. 2, is of a length and spacing to provide for idling of the engine without disengagement or disconnection of any part of the transmission mechanism, and the one-way clutch provides for free wheeling of a vehicle equipped with the transmission. The spiral spring drive also provides a cushion against sudden engine load as may be occasioned by obstruction to movement of the wheel 10.

In normal operation, and upon idling of the engine, the fly wheel 15 will be caused to oscillate forwardly by the clutch and rearwardly by the spring in succession. The forward oscillation of the fly wheel, however, will have little momentum and the driving effort imparted to the torsion spring thereby may be resisted by light braking of the wheel 10, or as in the case of a scooter as disclosed, such braking may be effected by dragging of the rider's foot, etc.

Upon acceleration of the engine, however, the fly wheel 15 which is intermittently engaged by the clutch balls, will gain momentum with a consequent increase in driving torque in the spring 31 whereby the wheel 10 will be rotated thereby.

The driving torque in the spring 31 with any given load or resistance to rotation of the wheel 10 will increase with an increase of engine speed whereby the advantages of known forms of clutches are achieved.

Upon reduction of engine speed, the torsion spring 31 will gradually return to normal position so that when the engine is again idling, the vehicle may be retained at rest in the manner above set forth.

The reduction in the driving torque in the spring upon reduction of engine speed is effected by the use of the intermittent one-way clutch and such clutch readily provides for free wheeling as upon cutting out the engine, the wheel 10 together with the flywheel 15 are free for forward rotation on their respective sleeves 12 and 14, without interference of the one-way intermittent clutch.

From the foregoing it will be appreciated that the improved transmission mechanism is desirably adapted for vehicles of the scooter type as herein illustrated, wherein free forward movement of the vehicle may be had or such movement resisted during engine idling by suitable braking or merely dragging a foot of the driver.

However, the invention is applicable to various other forms of installation as the tendency to forward movement of the wheel or other rotary member may readily be overcome by subjecting such wheel or rotary member to a relatively light braking action.

While I have disclosed but a single specific embodiment of the invention, the same is to be considered as illustrative only, and not restrictive, the scope of the invention being defined in the sub-joined claims.

What is claimed is:

1. In combination, a shaft, a rotary member journalled on the shaft, a fly wheel journalled on the shaft in axially spaced relation to the rotary member, a yieldable drive connection between the fly wheel and rotary member, and a power driven clutch journalled on the shaft and including means having an intermittent one-way drive connection with the fly wheel.

2. In combination, a shaft, a rotary member journalled on the shaft adjacent one end thereof, a fly wheel journalled on the shaft in axially spaced relation to the rotary member, a torsion spring encircling the shaft and having its respective opposite ends connected to the rotary member and fly wheel, and an intermittent one-way power driven clutch journalled on the shaft adjacent its opposite end and cooperating with the fly wheel for imparting rotation thereto in a direction to wind the spring.

3. The structure according to claim 2 wherein said fly wheel includes a hub, and wherein said clutch includes a body portion journalled on the hub, said body portion having walls cooperating with said hub and providing wedging recesses, and spring pressed balls in said recesses.

4. In combination, a rotatable power shaft, a fixed shaft, a wheel rotatably journalled on the fixed shaft, an intermittent one-way clutch journalled on the fixed shaft, a pitman having one end thereof pivotally connected with the clutch, a crank connection between the other end of the pitman and the power shaft, and a yieldable drive connection between the wheel and the clutch, said drive connection including a fly wheel rotatably journalled on the fixed shaft and a torsion spring interconnecting the wheel and the fly wheel.

5. In combination, a shaft, a rotary member journalled on the shaft adjacent one end thereof, a fly wheel including a disk body portion and a hub portion journalled on the shaft adjacent the opposite end thereof with the disk body portion spaced from the rotary member, a spiral torsion spring encircling the shaft between the rotary member and disk body portion and having its respective opposite ends secured thereto, an intermittent clutch body portion journalled on said hub portion, a cover plate secured to the clutch body portion and journalled on said shaft at the opposite end thereof, recesses in said clutch body portion having arcuate camming walls, and spring pressed balls in said recesses engageable with said walls and said hub portion for effecting intermittent rotation of the fly wheel upon oscillation of said clutch body portion.

OSCAR V. MALMQUIST.